Patented Nov. 15, 1938

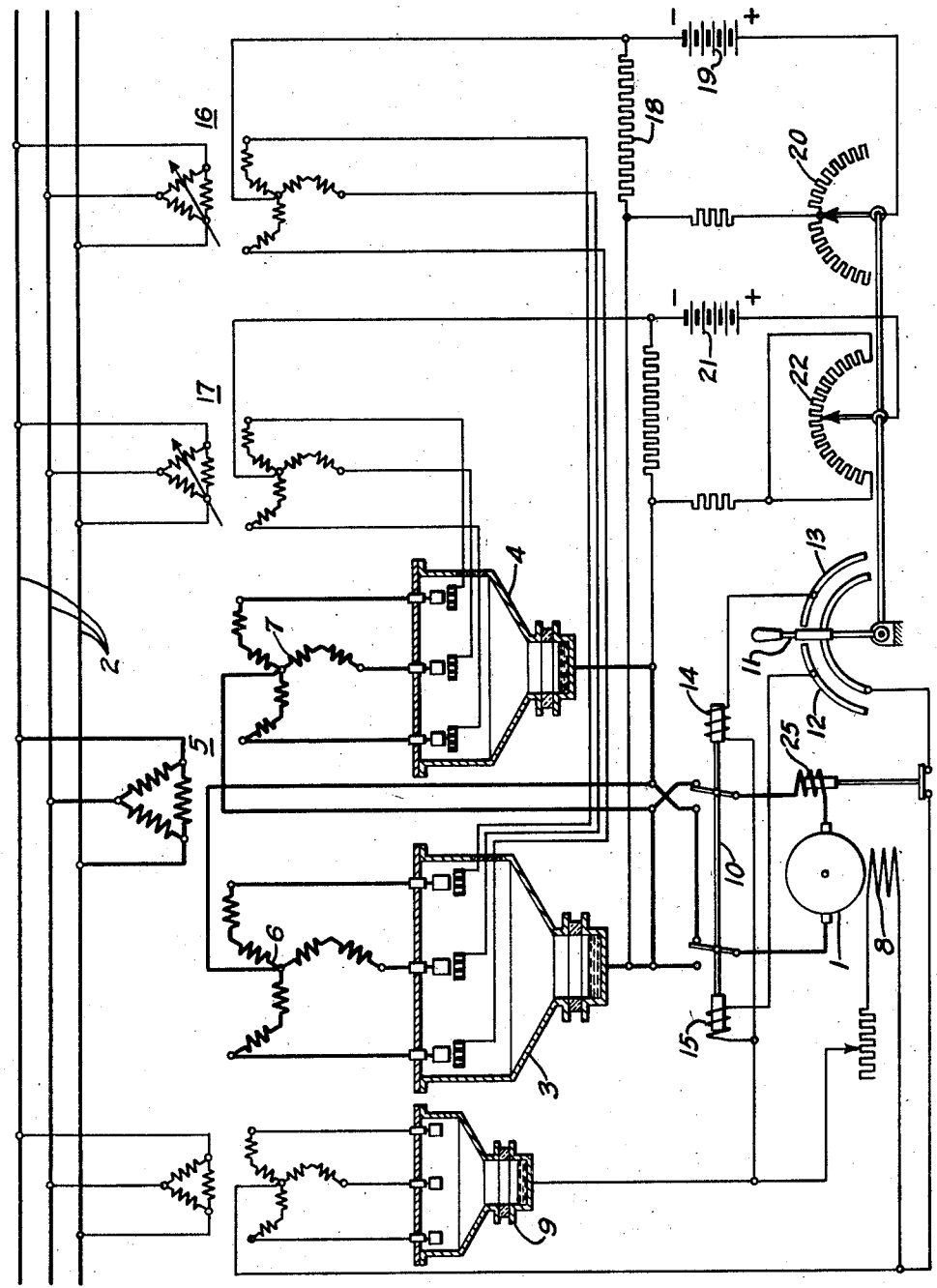

2,137,046

UNITED STATES PATENT OFFICE 2,137,046

RECTIFIER SYSTEM

Walter Fouquet, Zeuthen (Mark), Germany, assignor to Westinghouse Electric & Manufacturing Company, East Pittsburgh, Pa., a corporation of Pennsylvania Application July 1, 1937, Serial No. 151,480
In Germany June 20, 1936

5 Claims. (Cl. 172—179)

My invention relates to a control system for a reversible direct current motor and particularly to a system for controlling the energy transfer between a reversible direct current motor, having regenerative braking, and an alternating current supply circuit. When it is desired to control a reversible direct current motor, subject to regenerative braking, over a wide speed range, it has heretofore been customary to use a so-called Ward Leonard system for controlling the transfer of energy between the direct current motor and the alternating current supply line.

It has heretofore been proposed to replace the Ward Leonard system by so-called cross connecting rectifiers in which two grid controlled converters are so controlled that one of the converters acts as a rectifier while the other operates as an inverter to feed back regenerative power to the alternating current circuit. When it is desired to change the direction of motor rotation, the control systems are so reversed that the converters exchange position, that is, the converter which has formerly been acting as a rectifier now becomes an inverter and vice versa.

This system has proven uneconomical in that it is necessary to provide two converters each capable of supplying the full driving power required by the converter, while the feed back power is of relatively small proportions compared to the driving power supplied to the motor.

It is an object of my invention to provide a control system having two converters, one of which constantly operates as a rectifier and has a sufficiently large capacity to supply the power requirements of the motor and another which constantly operates inverted and is only of sufficient size to handle the regenerative power, a suitable changeover switch being provided for reversing the direction of current flow through the armature in order to reverse the direction of rotation thereof.

It is a further object of my invention to provide a control system in which the direct current supplied to the motor may be varied over a wide range by a simple control mechanism.

It is a further object of my invention to provide a control system for the inverted converter interlocked with the control system of the converter operating as a rectifier.

Other objects and advantages of my invention will be apparent from the following detailed description taken in conjunction with the accompanying drawing, in which the figure is a schematic illustration of a control system according to my invention.

In the apparatus, according to the illustrated embodiment of my invention, a reversible direct current motor 1 is supplied with current from an alternating current circuit 2 by means of a grid controlled converter 3 and regenerative power, is returned to the circuit 2 by means of the controlled converter 4, both the converters 3 and 4 being connected to the alternating current circuit 2 by means of a transformer 5 having two substantially independent secondary windings 6 and 7. The converters 3 and 4 being connected in the so-called cross connection, that is the cathode of converter 3 is connected to the neutral point of the transformer winding supplying power to converter 4 and vice versa.

The field winding 8 of the reversible motor 1 is supplied with energy from any suitable source of direct current, such as an auxiliary converter 9. In order to reverse the direction of rotation of the motor 1, a suitable changeover switch 10 is provided which can be operated by any suitable mechanism such as a control lever 11 having oppositely disposed contacts 12 and 13 which control the supply of electrical energy to suitable magnetic controllers 14 and 15 operating with the reversing switch 10. Each of the converters 3 and 4 is provided with suitable control grids which are supplied with energy from any suitable device herein illustrated as control transformers 16 and 17.

In order to control the current supplied to the motor 1 over a relatively wide range, a biasing system comprising a potentiometer connected in series between the neutral of the control transformer 16 and the cathode of the rectifier 3 is supplied with direct current from any suitable system herein illustrated, as a biasing battery 19 and a variable resistor 20 for controlling the current flow through the potentiometer 18.

Likewise, the control transformer 17 for the inverted converter 4 is supplied with biasing current from a similar device comprising biasing battery 21 and control resistor 22. However, it is generally preferable to have the phase angle of the inverted converter changed inversely to the phase angle of the rectifier. For this purpose, I have shown the control resistors 20 and 22 as being oppositely connected, that is, shifting the contact on resistor 20 from the neutral point decreases the bias and increases current flow to the motor, while shifting the contact on resistor 22 from neutral increases the bias and reduces the feed back current. The sliding contact for each of the control resistors 20, 22 is mechanically connected to the control lever 11 so that moving the lever 11 in either direction from the neutral point will increase the current fed through the rectifier 4 to the motor 1 and inversely from the extreme position to the neutral point will increase the phase angle of the feed back through the inverted rectifier 4.

The operation of the control system according to my invention, assuming the motor 1 as being at rest, is as follows; the control handle 11 is moved in either direction according to the direction it is desired to operate the motor 1. This control handle 11 bridges one or the other of the contact mechanisms 12 or 13, energizing the proper solenoid 14 or 15 to place the reversing switch 10 in the desired direction. This connects the rectifier 4 to the motor 1, preferably at the low voltage output of the converter 4. Then to increase the current through the motor 1, the lever 11 is extended further in the desired direction. When the load is removed so that the motor 1 operates as a generator, the generated potential will overbalance the potential supplied by the rectifier 3 and feed back through the converter 4. If it is desired to increase the rate of feed back, the control handle 11 is moved toward the neutral position so that increased feed back will occur as the handle approaches the neutral position.

If it is desired to reverse the motor 1, the control handle is simply moved in the other direction, deenergizing one of the control solenoids and energizing the other so that the changeover switch 10 is reversed. If desired, a suitable interlock 25 may be connected to the control handle 11 so that the changeover switch 10 may not be operated except below a minimum current in the motor circuit.

For purposes of illustration, I have shown and described a specific embodiment of my invention. It will be apparent that many changes and modifications can be made therein without departing from the true spirit of my invention or the scope of the appended claims.

I claim as my invention:

1. Rectifier arrangement for the control of energy interchange between an alternating current network and a direct current load of changing polarity operating at times as a generator, consisting of two discharge vessels of which the cathode of each is connected to the transformer neutral point of the other and of which always one vessel operates as rectifier and one vessel as inverter characterized by the fact that each of the two discharge vessels as well as the associated control devices are equipped and dimensioned corresponding to the requirements of one or the other of the energy directions, and a single changeover switch is provided which changes the connections of the direct current load for the purpose of changing the polarity with reference to the discharge vessels characterized by a current protector in the direct-current conductor which only permits a changeover of the connections of the direct-current load when the direct current is below a predetermined value.

2. A conversion system for controlling energy transfer from an alternating-current circuit to a direct-current reversible dynamo-electric device subject to regenerative braking, comprising two valve type converters, one of said converters constantly being controlled as a rectifier and the other constantly being controlled as an inverter, a reversing switch for controlling the direction of rotation of said dynamo-electric device, and control means for each of said converters for determining the amount of energy transfer between said alternating-current circuit and said dynamo-electric device.

3. A conversion system for controlling energy transfer from an alternating-current circuit to a direct-current reversible dynamo-electric device subject to regenerative braking, comprising two valve type converters, one of said converters constantly being controlled as a rectifier and the other constantly being controlled as an inverter, a reversing switch for controlling the direction of rotation of said dynamo-electric device, and control means for each of said converters for determining the amount of energy transfer between said alternating-current circuit and said dynamo-electric device, the control means for each of said converters being actuated by a common operating means.

4. A motor speed control system for a reversible motor having regenerative braking, comprising a supply circuit, a reversible direct-current motor, a plurality of multi-path vapor-electric converters for transferring energy between said circuit and said motor, one of said converters being constantly operative to feed energy from said circuit to said motor, another of said converters being operative to feed energy from said motor to said circuit, control means for regulating the amount of energy passed by each of said converters, switching means for reversing the direction of rotation of said motor and a controller for determining the position of said switching means.

5. A motor speed control system for a reversible motor having regenerative braking, comprising a supply circuit, a reversible direct-current motor, a plurality of multi-path vapor-electric converters for transferring energy between said circuit and said motor, one of said converters being constantly operative to feed energy from said circuit to said motor, another of said converters being operative to feed energy from said motor to said circuit, control means for regulating the amount of energy passed by each of said converters, switching means for reversing the direction of rotation of said motor, a controller for determining the position of said switching means, and a load responsive relay for preventing operation of said switching means above predetermined loads on said motor.

WALTER FOUQUET.